United States Patent
Wang (10) Patent No.: US 7,276,133 B2
(45) Date of Patent: Oct. 2, 2007

(54) METHOD FOR MANUFACTURING A DOORMAT

(76) Inventor: Hui Li Wang, P.O.Box 2103, Taichung City (TW)

( * ) Notice: Subject to any disclaimer, the term of this patent is extended or adjusted under 35 U.S.C. 154(b) by 412 days.

(21) Appl. No.: 10/882,162

(22) Filed: Jul. 2, 2004

(65) Prior Publication Data

US 2005/0092430 A1    May 5, 2005

(30) Foreign Application Priority Data

Oct. 29, 2003  (TW) ............................. 92130151 A (51) Int. Cl.
 *B32B 37/00*  (2006.01)
 *B32B 37/12*  (2006.01)
(52) U.S. Cl. .................. 156/278; 156/63; 156/277; 156/256
(58) Field of Classification Search .................. 156/63, 156/60, 278, 277, 250, 256
See application file for complete search history.

(56) References Cited

FOREIGN PATENT DOCUMENTS

FR        2627403 A1 *  8/1989

* cited by examiner

*Primary Examiner*—Jeff H. Aftergut
(74) *Attorney, Agent, or Firm*—Rosenberg, Klrin & Lee (57) ABSTRACT

A method for manufacturing a doormat, including steps of: preparing a PVC loop mat and a substrate; and before or after the PVC loop mat is adhered to the substrate, spraying a different color of paint made of a resin onto the PVC loop mat by way of pressurized spraying to form desired pictures or characters on predetermined portions of the PVC loop mat. Thereafter, a doormat with a PVC loop mat having different colors of pictures is achieved.

10 Claims, 8 Drawing Sheets

METHOD FOR MANUFACTURING A DOORMAT

BACKGROUND OF THE INVENTION

The present invention is related to a method for manufacturing a doormat, and more particularly to a method for manufacturing a doormat having characters or pictures with a color different from a background color.

A conventional doormat is placed in front of a door for scraping off the mud or sands attached to the soles. In order to beautify the appearance of the doormat, the doormat is often formed with characters or pictures with a color different from the background color for beautifying the doormat. For example, the doormat is often formed with "WELCOME" with a color different from the background color.

Figure 6:
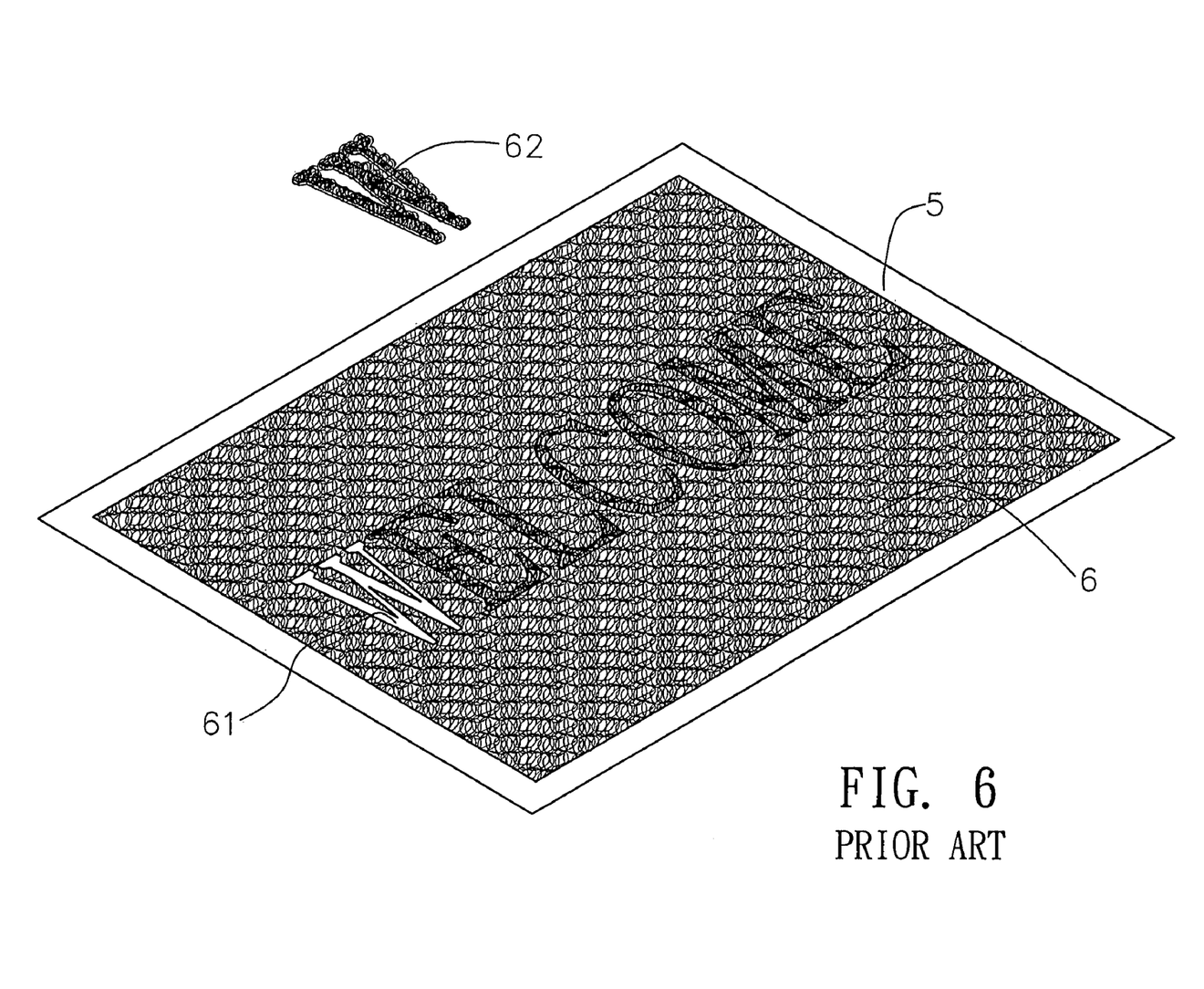
FIG. 6 shows a conventional method for forming different colors of characters on a doormat.

FIG. 6 shows a conventional method for forming the characters on the doormat. A flexible PVC (by meanings of polyvinyl chloride) loop mat 6 is adhered to a substrate 5. The PVC loop mat 6 is composed of PVC loops which are continuously matted with each other. Before the PVC loop mat 6 is adhered to the substrate 5, the PVC loop mat 6 is previously cut to form hollow sections 61 showing the shapes of the characters. Then the PVC loop mat 6 is adhered to the substrate 5. Thereafter, character blocks 62 with different colors are respectively inlaid in the hollow sections 61. The character blocks 62 are made of identical PVC loops and have shapes corresponding to the shapes of the hollow sections 61. The character blocks 62 are then adhered to the substrate 5 to achieve a doormat with different colors of characters.

The character blocks 62 are inlaid in the hollow sections 61 of the PVC loop mat 6 and then adhered to the substrate 5. Such arrangement has a shortcoming that after the doormat has been treaded for a period of time, the character blocks 62 tend to detach from the doormat. This will deteriorate the function and appearance of the doormat.

Moreover, the PVC loop mat 6 and the character blocks 62 are both made of plastic material and have less change in color. Therefore, the doormat often has a monotonous color and lacks highlighting effect.

Figure 7:
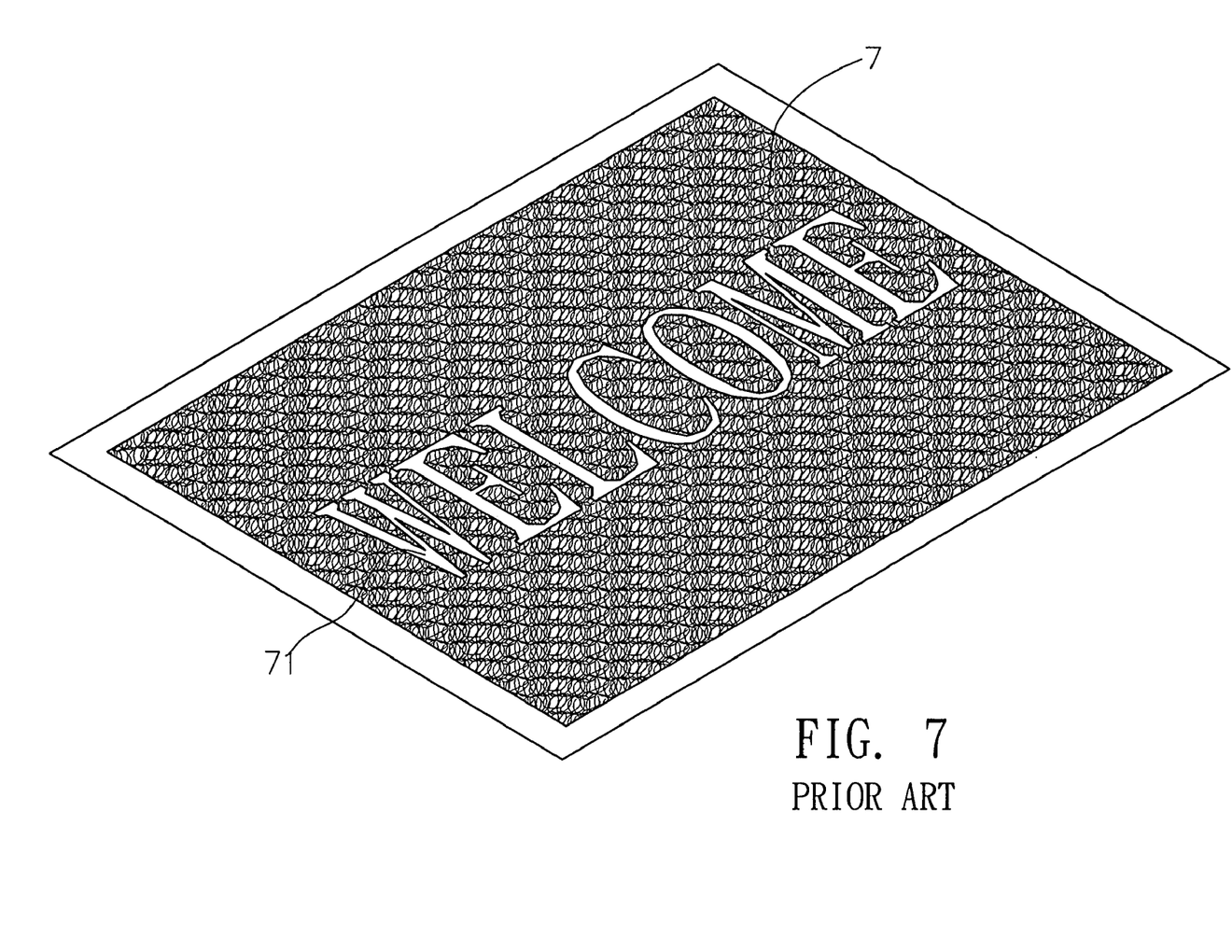
FIG. 7 shows another conventional method for forming different colors of characters on a doormat.

FIG. 7 shows another method for forming different colors of characters on the doormat. Character films 71 are made of plastic film by cutting. Then the character films 71 are thermally pressed onto predetermined portions of the PVC loop mat 7 to form characters on the doormat with different colors.

Figure 8:
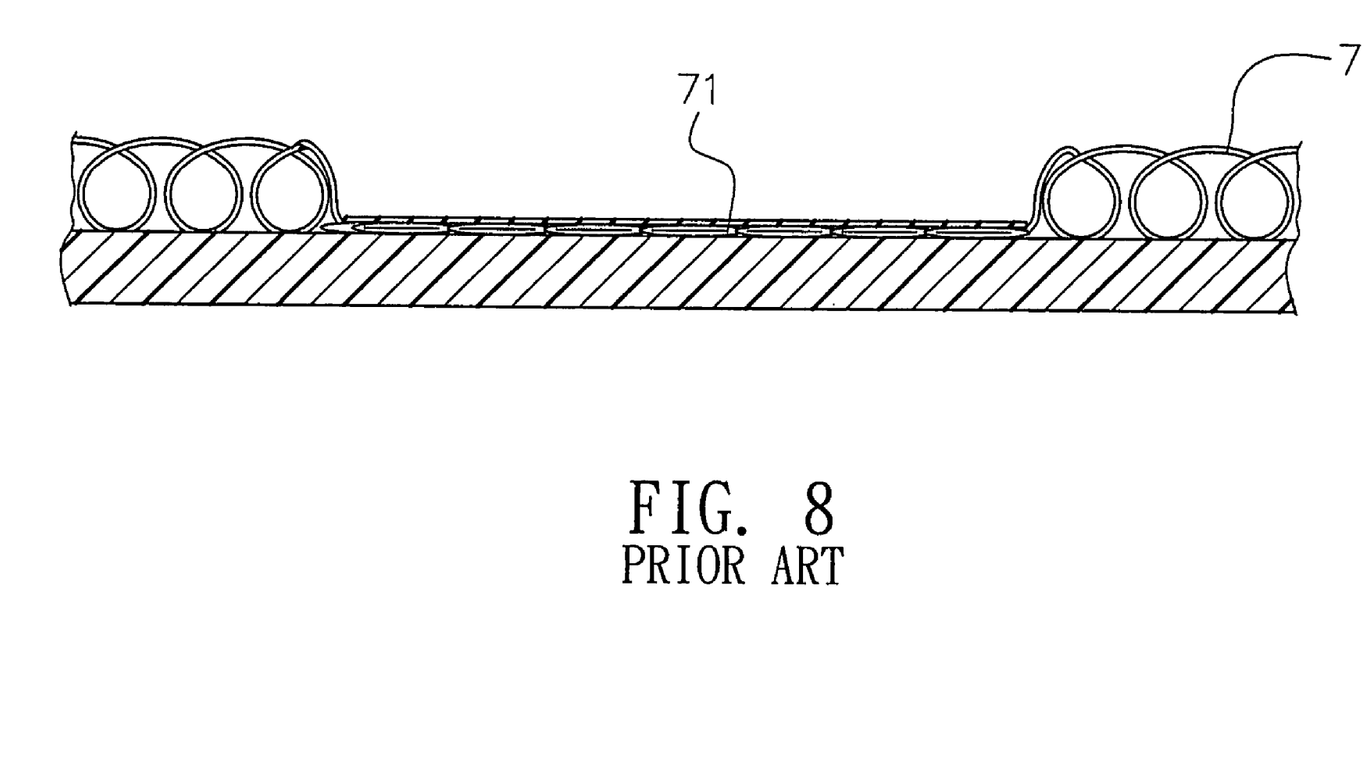
FIG. 8 is a sectional view showing that according to the method of FIG. 7, the doormat is partially flattened by the character films.

The character films 71 are attached to the PVC loop mat 7 by means of thermal press. Therefore, the winding loop of the PVC loop mat 7 around the character films 71 will be planed as shown in FIG. 8. Under such circumstance, the portions of the PVC loop mat 7 with the character films 71 will lose elasticity and mud scraping function. Especially, in order to highlight the characters of the doormat, the character films 71 often have a considerably large size. Therefore, a large area of portion of the PVC loop mat 7 is flattened. This will greatly reduce the mud scraping function of the PVC loop mat 7.

SUMMARY OF THE INVENTION

It is therefore a primary object of the present invention to provide a method for manufacturing a doormat, in which a different color of paint is sprayed onto the PVC loop mat of the doormat by way of pressurized spraying to form desired pictures or characters on predetermined portions of the PVC loop mat. Thereafter, a doormat with a PVC loop mat having different colors of pictures is achieved. The loops of the PVC loop mat are simply coated with the paint. The paint is made of a resin having the same properties as the PVC loop mat. The resin is first molten into liquid state and then mixed with a color to form the paint so that the paint can be firmly combined with the PVC loop mat. Even after having been treaded for a long time, the pictures will not be worn off.

It is a further object of the present invention to provide the above the method for manufacturing the doormat. The loops of the PVC loop mat are simply coated with the paint. Therefore, the flexibility of the loops of the PVC loop mat 11 will not be affected so that the doormat will not lose its elasticity and mud scraping function.

It is still a further object of the present invention to provide the above method for manufacturing the doormat. The pictures are formed on the PVC loop mat by way of spraying. The colors of the sprayed paint are bright and variable so that the pictures of the doormat can enriched to beautify and highlight the appearance of the doormat.

The present invention can be best understood through the following description and accompanying drawings wherein:

DETAILED DESCRIPTION OF THE PREFERRED EMBODIMENTS

Please refer to FIGS. 1 to 4. According to a first embodiment, the method for manufacturing the doormat of the present invention includes steps of:

step 1 of preparing material: preparing a PVC loop mat 11 and cutting the PVC loop mat 11 into a suitable size and shape, in this embodiment, the PVC loop mat 11 being cut into a rectangular shape;

step 2 of making pictures: spraying paint onto the PVC loop mat 11 to form desired pictures 21 on predetermined portions of the PVC loop mat 11, the paint being made of a resin having the same properties as the PVC loop mat 11, the resin being first molten into liquid state and then mixed with a color to form the paint, in this embodiment, the paint being directly sprayed onto the PVC loop mat 11 by means of a sprayer to form the pictures 21 of "WELCOME", alternatively, a moldboard 22 sculptured with "WELCOME" characters being overlaid on the PVC loop mat 11, then the paint being sprayed into the sculptured characters to attach to the PVC loop mat 11 to form "WELCOME" pictures 21 on the PVC loop mat 11; and step 3 of forming the doormat: fixedly attaching the PVC loop mat 11 sprayed with the pictures 21 onto a substrate 31, in this embodiment, a glue being previously painted on the predetermined portions of the substrate 31 on which the PVC loop mat 11 is to be adhered, then the PVC loop mat 11 being adhered to the substrate 31, after the glue is solidified, a doormat with a PVC loop mat 11 having different colors of pictures 21 being achieved.

According to the above manufacturing method of the present invention, the paint is sprayed onto the PVC loop mat 11 to form desired pictures 21 in predetermined positions. Then the PVC loop mat 11 sprayed with the pictures 21 is attached to the substrate 31 and fixed thereon to achieve a doormat with a PVC loop mat 11 having different colors of pictures 21.

Figure 1:
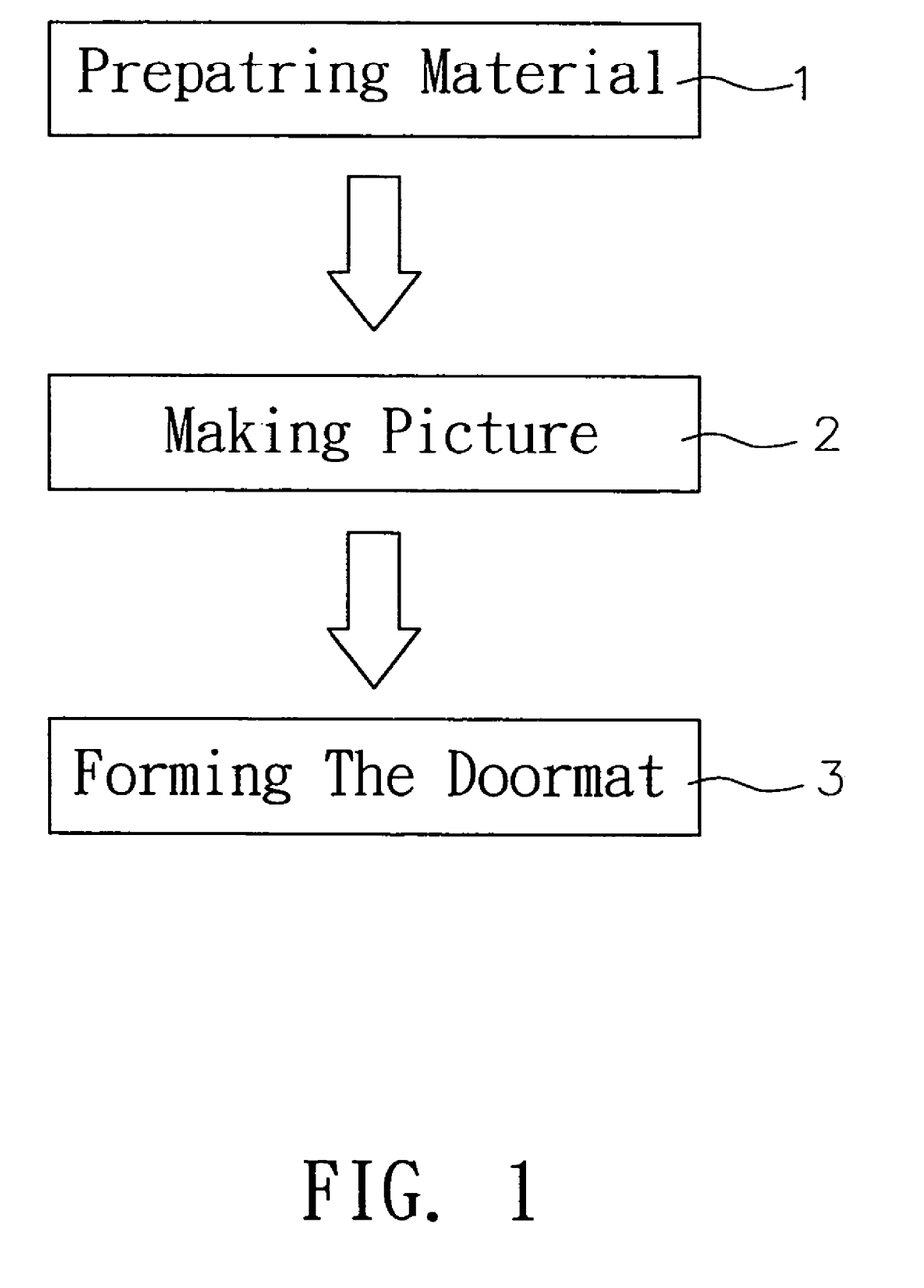
FIG. 1 is a block flow chart of the present invention.
Figure 2:
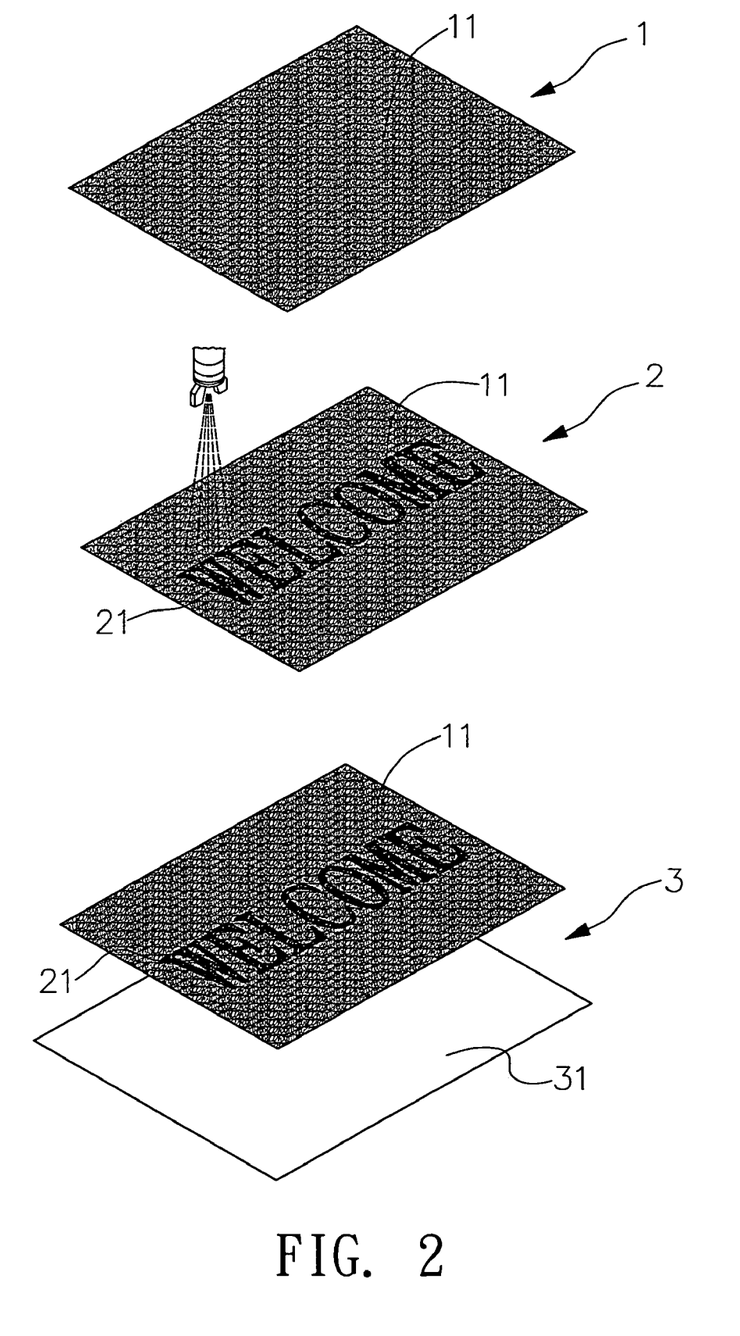
FIG. 2 shows a manufacturing procedure in which the paint is directly sprayed onto the PVC loop mat of the present invention.
Figure 3:
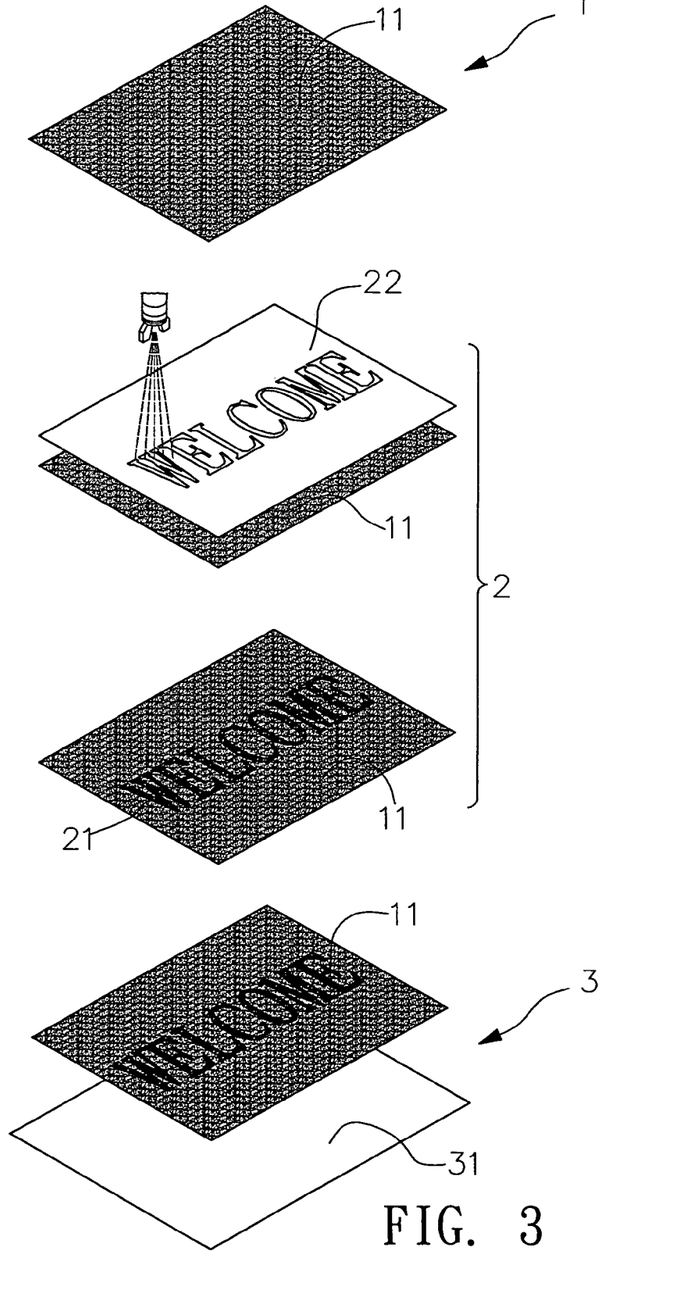
FIG. 3 shows a manufacturing procedure in which the paint is sprayed through a moldboard onto the PVC loop mat of the present invention.
Figure 4:
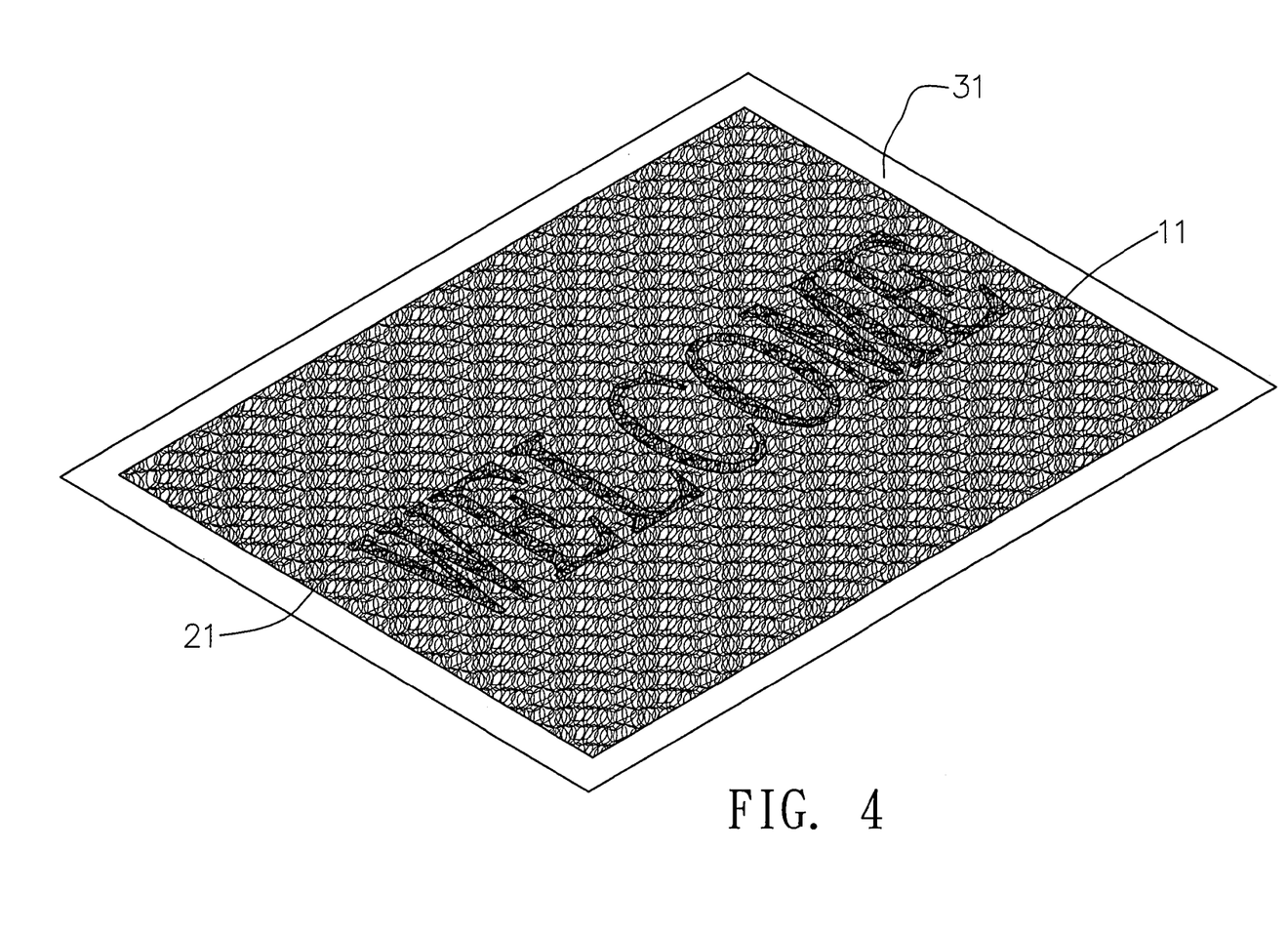
FIG. 4 shows a product of the doormat of the present invention after sprayed.

The pictures 21 are formed on the PVC loop mat 11 by way of spraying. Therefore, the loops of the PVC loop mat 11 are coated with the paint. Moreover, the paint is made of a resin having the same properties as the PVC loop mat 11 so that the paint can be fully attached to and combined with the PVC loop mat 11. Therefore, even after having been treaded for a long time, the paint of the pictures 21 will not detach from the PVC loop mat 11.

Furthermore, the loops of the PVC loop mat 11 are simply coated with the paint mainly made of the resin. Therefore, the flexibility of the loops of the PVC loop mat 11 will not be affected. In other words, the doormat will not lose its elasticity and mud scraping function.

Besides, the pictures 21 are formed on the PVC loop mat 11 byway of spraying. The colors of the sprayed paint are bright and variable so that the pictures of the doormat can enriched to beautify and highlight the appearance of the doormat.

In consideration of mass-production, a bundle of not cut PVC loop mats 11 can be first directly formed with the pictures and then cut into a suitable size as desired. Such manufacturing procedure can achieve the same products with the same effect.

Figure 5:
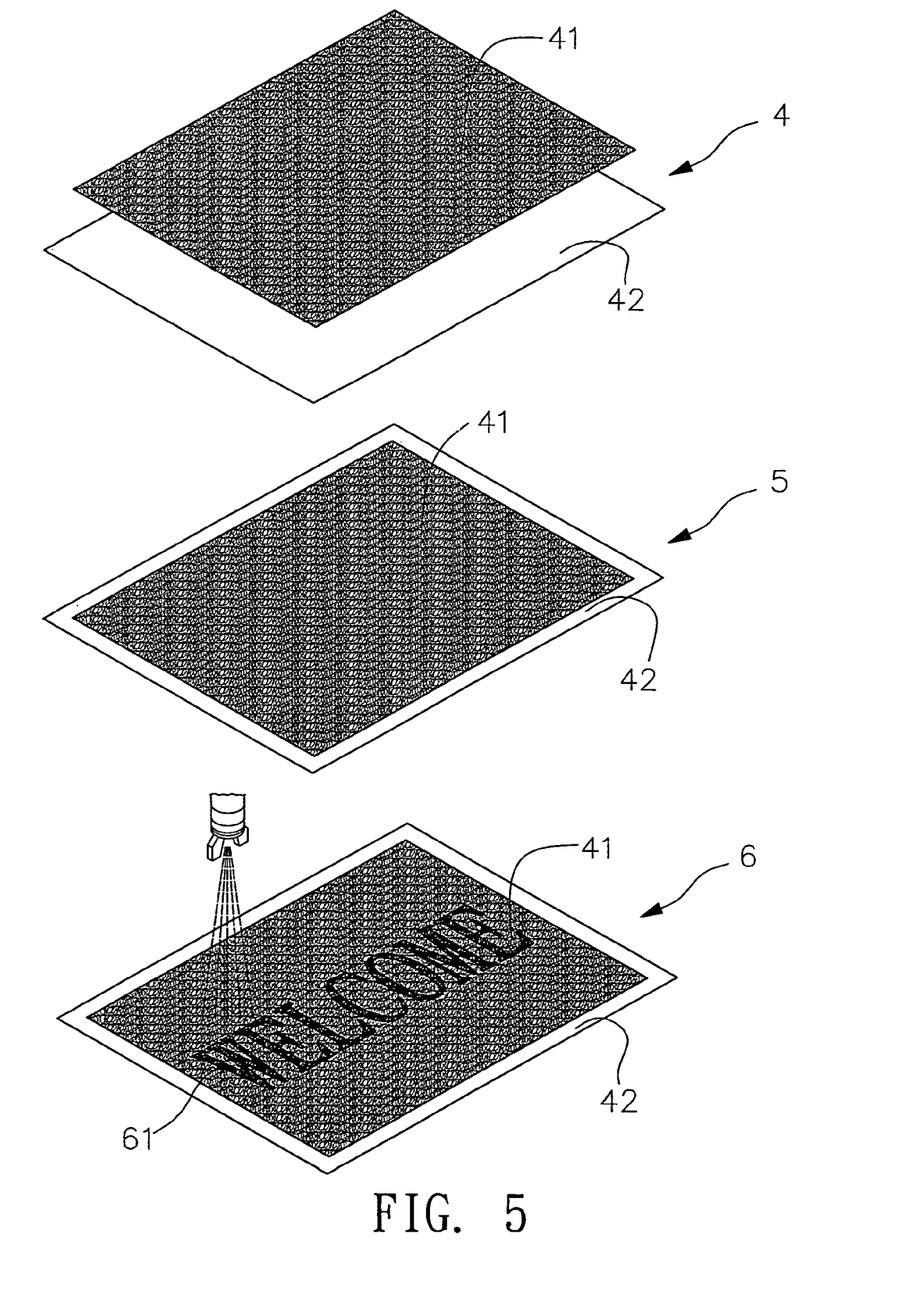
FIG. 5 shows another manufacturing procedure in which the paint is directly sprayed onto the PVC loop mat of the present invention.

FIG. 5 shows another embodiment of the manufacturing method of the present invention, including steps of:

step 4 of preparing material: preparing a PVC loop mat 41 and a substrate 42 and cutting the PVC loop mat 41 and the substrate 42 into a suitable size;

step 5 of attaching the PVC loop mat 41 onto the substrate 42: attaching the PVC loop mat 41 onto the substrate 42 and fixing the PVC loop mat 41 on the substrate 42, in this embodiment, a glue being previously painted on the predetermined portions of the substrate 42 on which the PVC loop mat 41 is to be adhered, then the PVC loop mat 41 being adhered to the substrate 41; and step 6 of forming the doormat: spraying a different color of paint onto the PVC loop mat 41 attached to the substrate 42 to form desired pictures 61 on predetermined portions of the PVC loop mat 41, the paint being made of a resin having the same properties as the PVC loop mat 41, the resin being first molten into liquid state and then mixed with a color to form the paint, in this embodiment, the paint being directly sprayed onto the PVC loop mat 41 to form the pictures 61 of "WELCOME", alternatively, a moldboard sculptured with "WELCOME" characters being overlaid on the PVC loop mat 41, then the paint being sprayed into the sculptured characters to attach to the PVC loop mat 41 to form "WELCOME" pictures 61 on the PVC loop mat 41, thereafter, a doormat with different colors of pictures 61 being achieved.

By means of the second manufacturing method of the present invention, the paint of the pictures also are not apt to detach from the PVC loop mat and the doormat can keep its elasticity and mud scraping function. Also, the colors of the sprayed paint are bright and variable so that the pictures of the doormat can enriched to beautify and highlight the appearance of the doormat.

The above embodiments are only used to illustrate the present invention, not intended to limit the scope thereof. Many modifications of the above embodiments can be made without departing from the spirit of the present invention.

What is claimed is:

1. A method for manufacturing a doormat, comprising the steps of:
preparing material including preparing a PVC loop mat;
making pictures including spraying paint directly onto the PVC loop mat by way of pressurized spraying to form desired pictures on predetermined portions of the PVC loop mat, the paint being made mainly of a resin having the same properties as the PVC loop mat, the resin being first molten into liquid state and then mixed with a color to form the paint; and
forming the doormat including attaching the PVC loop mat sprayed with the pictures onto a substrate and fixing the PVC loop mat thereon.

2. The method for manufacturing the doormat as claimed in claim 1, wherein in the step of preparing material, the PVC loop mat is cut into a rectangular shape with a certain size.

3. The method for manufacturing the doormat as claimed in claim 1, wherein in the step of making pictures, the paint with a color different from that of the PVC loop mat is directly sprayed onto the PVC loop mat.

4. The method for manufacturing the doormat as claimed in claim 1, wherein in the step of making pictures, a moldboard having sculptured sections is overlaid on the PVC loop mat and then the paint is sprayed into the sculptured sections of the moldboard attach to the PVC loop mat to form the pictures.

5. The method for manufacturing the doormat as claimed in claim 1, wherein in the step of forming the doormat, a glue is previously painted on predetermined portions of the substrate on which the PVC loop mat is to be adhered, then the PVC loop mat being adhered to the substrate.

6. A method for manufacturing a doormat, comprising steps of:
preparing material including:
preparing a PVC loop mat and a substrate;
attaching the PVC loop mat onto the substrate including:
attaching the PVC loop mat onto the substrate and fixing the PVC loop mat on the substrate; and
forming the doormat including:
spraying a different color of paint directly onto the PVC loop mat attached to the substrate by way of pressurized spraying to form desired pictures on predetermined portions of the PVC loop mat, the paint being made mainly of a resin having the same properties as the PVC loop mat, the resin being first molten into liquid state and then mixed with a color to form the paint.

7. The method for manufacturing the doormat as claimed in claim 6, wherein in the step of preparing material, the PVC loop mat and the substrate are cut into a rectangular shape with a certain size.

8. The method for manufacturing the doormat as claimed in claim 6, wherein in the step of attaching the PVC loop mat onto the substrate, a glue is previously painted on predetermined portions of the substrate on which the PVC loop mat is to be adhered, then the PVC loop mat being adhered to the substrate.

9. The method for manufacturing the doormat as claimed in claim 6, wherein in the step of forming the doormat, the paint with a color different from that of the PVC loop mat is directly sprayed onto the PVC loop mat.

10. The method for manufacturing the doormat as claimed in claim 6, wherein in the step of forming the doormat, a moldboard having sculptured sections is overlaid on the PVC loop mat and then the paint is sprayed into the sculptured sections of the moldboard attach to the PVC loop mat to form the pictures.

* * * * *